United States Patent [19]

Anderson et al.

[11] 3,895,079

[45] July 15, 1975

[54] PROCESS FOR RECOVERY OF DIHYDRIC PHENOLS

[75] Inventors: John E. Anderson; Ward J. Burkholder, both of Houston; Loyd W. Fannin, Dickinson, all of Tex.

[73] Assignee: The Goodyear Tire and Rubber Company, Akron, Ohio

[22] Filed: June 28, 1972

[21] Appl. No.: 267,093

[52] U.S. Cl. .......................... 260/621 A; 260/593 A
[51] Int. Cl. ............................................. C07c 37/22
[58] Field of Search .................... 260/621 C, 621 A

[56] References Cited
UNITED STATES PATENTS 2,748,172  5/1956  Rodgers ......................... 260/621 C Primary Examiner—Bernard Helfin
Assistant Examiner—Norman Morgenstern
Attorney, Agent, or Firm—Browning & Bushman

[57] ABSTRACT

A process for recovering dihydric phenols of high purity from a reaction mixture produced by the rearrangement of an aralkyl tertiary hydroperoxide and comprising primarily a ketone and wherein the total reaction mixture is subjected to selective hydrogenation to hydrogenate the minor amounts of hydroperoxides, aryl tertiary alkenes and alkenyl phenols. Following separation of the ketone, the dihydric phenol is recovered by crystallization.

5 Claims, 1 Drawing Figure

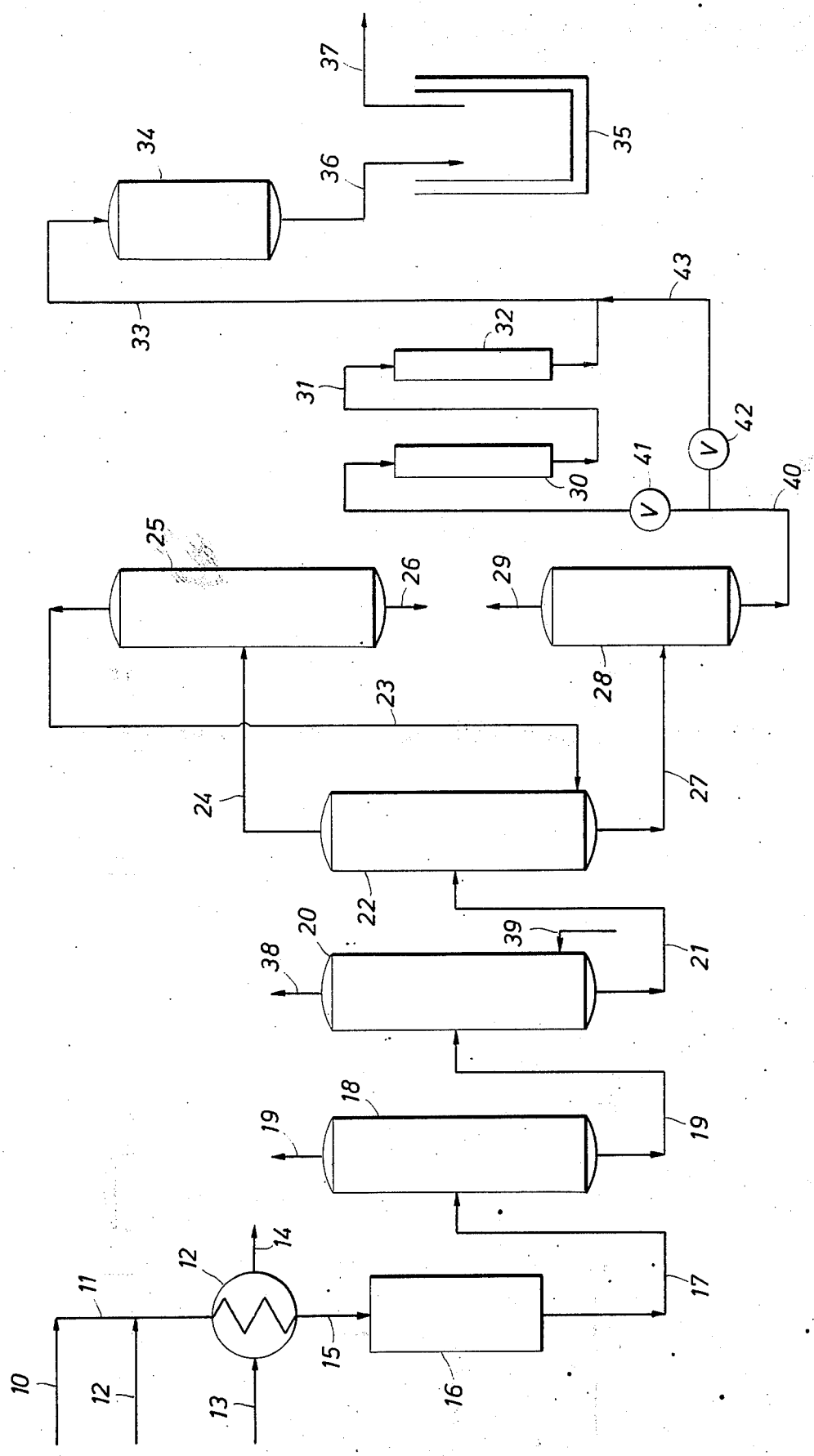

PROCESS FOR RECOVERY OF DIHYDRIC PHENOLS

BACKGROUND OF THE INVENTION

The present invention relates to the recovery of a dihydric phenol from a reaction product resulting from the rearrangement of an aralkyl tertiary hydroperoxide and more particularly to the recovery of hydroquinone from a reaction product resulting from the rearrangment of p-diisopropylbenzene dihydroperoxide.

It is known that dihydric phenols such as hydroquinone and resorcinol can be produced by the oxidation of an aryl tertiary alkane to an aralkyl tertiary hydroperoxide and the subsequent rearrangement of the aralkyl tertiary hydroperoxide to form a reaction product comprising the dihydric phenol, a ketone and unreacted aryl tertiary alkane. In addition to the above named components, the rearrangement reaction produces minor amounts of aryl tertiary alkenes and alkenyl phenols. Moreover, it is not uncommon for the rearranged reaction mixture to contain minor amounts of unreacted hydroperoxides. The prior art, as exemplified by U.S. Pat. No. 3,205,272, teaches that the ketone free rearranged product can be hydrogenated under certain conditions to convert the aryl tertiary alkenes to the corresponding alkanes and thus prevent polymerization of the alkene when the phenol is subsequently recovered by the commonly employed distillation methods.

In the commercial production of dihydric phenols such as hydroquinone and resorcinol, certain specifications must be met by the product. For example, in the case of hydroquinone, the product must be in a form which does not produce "dusting" when used. This usually requires that the product pass bulk density, particle size and flow index requirements in order to be acceptable. Water solubility and color specification must also be met for certain grades of hydroquinone. Generally speaking, in order for a dihydric phenol such as hydroquinone to pass the aforementioned specifications, it is necessary that the material be recovered in a crystalline form as opposed to a fluffy, powdery form. In order to achieve adequate crystallization of the dihydric phenols, it is oftentimes necessary to resort to expensive processing steps such as carbon bed treatment of the dihydric phenol stream prior to crystallization. Even then it is frequently not possible to achieve the desired crystallization and thus the recovered product will not meet the standards discussed above.

SUMMARY OF THE INVENTION

It is therefore an object of the present invention to provide an improved method of recovering dihydric phenols produced by the acid catalyzed rearrangement of an aralkyl tertiary hydroperoxide.

It is a further object of the invention to provide a process for the removal of certain impurities from the reaction product resulting from the rearrangement of an aralkyl tertiary hydroperoxide.

Still another object of the present invention is to provide an improved process for the recovery of hydroquinone from a rearranged reaction product containing a ketone and minor amounts of aryl tertiary alkenes and hydroperoxides.

These and other objects of the present invention will become apparent from the drawing, the description given herein and the appended claims.

Basically, the process of the present invention comprises hydrogenating a reaction product containing primarily a ketone, lesser amounts of a dihydric phenol and minor amounts of aryl tertiary alkenes, alkenyl phenols, hydroperoxides and other impurities and subsequently separating the dihydric phenol, preferably by crystallization.

According to one embodiment of the process wherein the dihydric phenol is hydroquinone, the reaction product is subjected to a selective hydrogenation wherein the alkenes are hydrogenated and the hydroperoxides presumably reduced. Water is then added to the hydrogenated reaction product and the ketone separated therefrom. Following the ketone removal step, the mixture of the hydrogenated reaction product and water is extracted with an aromatic hydrocarbon and an aqueous phase containing the hydroquinone and substantially free of the aromatic hydrocarbon, is separated. At least a portion of the water is removed from the aqueous phase and the hydroquinone is then crystallized from the concentrated hydroquinone-water mixture.

BRIEF DESCRIPTION OF THE DRAWING

The single FIGURE is a diagrammatic representation of the process of the present invention.

DESCRIPTION OF THE PREFERRED EMBODIMENT

According to the process of the present invention, a reaction product comprising a dihydric phenol such as hydroquinone or resorcinol, a ketone, such as acetone, and minor amounts of aryl tertiary alkenes, alkenyl phenols and hydroperoxides is treated in a hydrogenation reaction to selectively hydrogenate the olefinic unsaturates and presumably reduce the hydroperoxides and thus allow recovery of the dihydric phenol in a pure form. The dihydric phenol is produced by the acid catalyzed rearrangement of an aralkyl tertiary hydroperoxide which in turn is obtained by the oxidation of an alkyl aromatic hydrocarbon and more specifically an aryl tertiary alkane. The aryl tertiary alkane, from which the hydroperoxides which are partially the subject of the present invention are obtained, may be defined in terms of the formula:

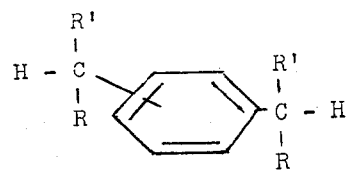

wherein R and R' may be the same or different and are alkyl or cycloalkyl. The alkyl radical may be straight chain or branched chain. Non-limiting examples of such compounds include m- and p-diisopropylbenzene, m- and p-di-sec-butylbenzene, isopropyl-4-sec-butylbenzene, isopropyl-3-sec-butylbenzene and the like.

The oxidation of the aryl tertiary alkanes results in the formation of aralkyl tertiary hydroperoxides having the formula:

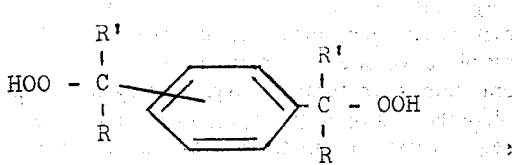

wherein R and R' have the same significance as in the previously described formula for the aryl tertiary alkanes. Non-limiting examples of the aralkyl tertiary hydroperoxides include m- and p-$\alpha,\alpha,\alpha',\alpha'$-tetramethylxylylene dihydroperoxide and m- and p-$\alpha$methyl $\alpha$ethyl, $\alpha'$ methyl, $\alpha'$ ethyl-xylylene dihydroperoxide and the like.

Generally speaking the rearrangement reaction of an aralkyl tertiary hydroperoxide such as the ones under consideration, results in the formation of a phenol and a ketone. However, other materials which interfere with the recovery of the dihydric phenol are also produced in the rearrangement reaction. For example, there are also produced unsaturated materials particularly aryl tertiary alkenes as for example m- and p-isopropenyl cumene, m- and p-diisopropenyl benzene and the like. In addition to the aryl tertiary alkenes produced, alkenyl phenols may also be produced. For example, in the production of hydroquinone, if the feed to the rearrangement reaction contains $\alpha$,-hydroxy, $\alpha'$-hydroperoxy-p-diisopropylbenzene, p-isopropenyl phenol, an alkenyl phenol is produced. It has been found that these impurities plus unrearranged hydroperoxides can adversely effect the recovery of the dihydric phenol and more particularly can adversely effect the crystallization of the dihydric phenol. Furthermore, residual hydroperoxide acts to convert hydroquinone to quinone and other undesirable by-products, thus lessening hydroquinone recovery and contributing to poor color in the recovered product.

While the present process is applicable to the recovery of hydroquinone or resorcinol produced from a wide variety of aralkyl tertiary hydroperoxides which in turn are produced from a wide variety of aryl tertiary alkanes, the invention will be described with particular reference to the recovery of hydroquinone from a reaction product resulting from the acid catalyzed rearrangement of p-diisopropylbenzene dihydroperoxide which in turn has been produced by the oxidation of p-diisopropylbenzene. Referring then to the drawing, a neutralized reaction product resulting from the acid catalyzed rearrangement of p-diisopropylbenzene dihydroperoxide and containing acetone, benzene, hydroquinone, p-diisopropenylbenzene, p-isopropenyl phenol, p-isopropenyl cumene, trace amounts of hydroperoxides and other impurities, passes via line 10 into line 11 where it is admixed with hydrogen from a suitable source entering via line 12. The combined hydrogen-feed mixture flows via line 11 through heat exchanger 12, which is heated or cooled with steam or chilled water, respectively, entering line 13 and exiting via line 14. The heated or cooled reaction product leaves exchanger 12 via line 15 and then passes into hydrogenation zone 16. Hydrogenation zone 16 contains hydrogenation catalyst capable of selectively hydrogenating the olefinic unsaturation present in the aryl tertiary alkenes and the alkenyl phenols and reducing any hydroperoxides still remaining after the rearrangement reaction.

The hydrogenated reaction product is removed from hydrogenation zone 16 and passes via line 17 into separator 18 where the hydrogen is removed via line 19 and processed for recycle back to line 12. The hydrogenation reaction product, essentially free of excess hydrogen, is removed from separator 18 through line 19 and passes into a distillation column 20 into the lower portion of which is introduced water through line 39, the water serving the purpose of preventing precipitation of solid hydroquinone in column 20. Acetone is removed overhead from column 20 through line 38 for recovery.

The acetone free product containing relatively large amounts of water is removed from column 20 through line 21 and is introduced into a countercurrent extractor 22. Benzene enters the lower portion of extractor 22 through line 23 passing upwardly and being removed from extractor 22 through line 24. The benzene is passed to benzene recovery column 25 to be recovered and recycled back through line 23 to extractor 22. A heavy ends fraction is removed from column 25 through line 26 for further processing or other disposal. The benzene fraction being removed from extractor 22 through line 24 contains the majority of the hydrocarbon soluble impurities including the bulk of the aryl tertiary alkanes produced in the hydrogenation zone 16. Since the aryl tertiary alkanes are more readily extracted than the aryl tertiary alkenes, the hydrogenation procedure thus increases the efficiency of extractor 22 in terms of removal of impurities from the aqueous stream.

An aqueous phase containing substantially all of the hydroquinone is removed from extractor 22 through line 27 and passes into evaporator 28 where at least a portion of the water is removed overhead through line 29. The water-hydroquinone concentrate removed from evaporator through line 40 can proceed through two processing paths. If it is desired to recover "needles" of hydroquinone in the crystallization step, the water-hydroquinone concentrate passes via line 40 and valve 41 through carbon beds 30 and/or 32 connected by line 31, valve 42 leading to line 43 being closed. The water-hydroquinone concentrate then passes through line 33 into crystallizer 34 where the hydroquinone is crystallized, the wet cake of hydroquinone being passed from crystallizer 34 into centrifuge 35 through line 36. Following centrifugation, the hydroquinone is removed via line 37 and sent to a suitable drying means.

If it is desired to recover granulated, crystalline hydroquinone as opposed to needles thereof, the carbon bed treatment can be dispensed with. In this case, valve 41 is closed, valve 42 is open and the water-hydroquinone concentrate passes through line 40, valve 42 and line 43 into line 33. It then flows from line 33 into crystallizer 34 and ultimately into centrifuge 35 for treatment as described above for the case of the water-hydroquinone concentrate passing through carbon beds 30 and 32.

Carbon beds 30 and 32 are filled with an activated carbon which serves the purpose of removing the last traces of unwanted impurities which might cause objectionable color in or prevent adequate crystallization of the hydroquinone.

It is common for the reaction product which is fed to hydrogenation zone 16 to contain, in addition to the ketone and dihydric phenol produced in the rearrangement reaction, additional ketone which is added to dissolve the aralkyl tertiary hydroperoxide prior to rearrangement. The ketone used to dissolve the hydroperoxide is usually chosen to be the same as the one produced in the rearrangement reaction thus obviating further separation problems. In addition, as noted in the detailed description of the process, the reaction product from the rearrangement reaction will normally contain an aromatic hydrocarbon solvent which is used in recovering and processing the dihydroperoxide from the oxidation reactor and which remains in the dihydroperoxide cake which is subsequently rearranged. Generally speaking, the hydrocarbon solvent present in the dihydroperoxide cake will comprise an aromatic hydrocarbon such as benzene, a monoalkylbenzene wherein the alkyl group has from 1 – 4 carbon atoms, a dialkylbenzene wherein the alkyl group has from 1 – 4 carbon atoms or a trialkylbenzene wherein the alkyl group has from 1 – 4 carbon atoms. In a typical situation involving the recovery of hydroquinone, the reaction product which is fed to hydrogenation zone 16 via line 10 will contain, by weight, 60 – 70% ketone, usually acetone, 25 – 30% of the aromatic hydrocarbon solvent discussed above, 2 – 10% hydroquinone and 0.1 – 3% of impurities including unreacted hydroperoxides, aryl tertiary alkenes and alkenyl phenols.

The catalyst employed in hydrogenation zone 16 will be one which selectively hydrogenates the olefinic unsaturates and reduces the hydroperoxides without adversely affecting components such as the dihydric phenol or the ketone. A suitable catalyst in this respect is a palladium catalyst supported on a carrier such as alumina, charcoal, silica gel, silicaalumina, kieselguhr and the like. If desired, the palladium catalyst can be employed alone as a finely divided material rather than being supported on the above mentioned carriers. When a carrier is employed, the palladium content of the catalyst will vary from 0.05 – 20% by weight or greater.

Reaction conditions in the hydrogenation zone can vary over wide limits. For example, the liquid/hourly space velocity (LHSV) can vary from about 0.1 v/v/hr to about 10 v/v/hr or higher. The amount of hydrogen added will be sufficient to ensure substantially complete saturation of the olefinic unsaturates and complete reduction of the hydroperoxides. Usually, an excess of hydrogen is employed and may, for example, amount to about 100 to 1,000 standard cubic feet per barrel of reaction product fed to the hydrogenation zone. Temperatures in the hydrogenation zone can range from 100° to 500°F and pressures from 10 to 500 psig with temperatures of 150° to 250°F and pressures from 40 to 100 psig being especially preferred.

In the process shown in the accompanying drawing for the recovery of hydroquinone, an aromatic hydrocarbon extractant is used to treat the hydrogenated reaction product after water has been added and the acetone removed. The aromatic hydrocarbon extractant will be a liquid aromatic hydrocarbon and will preferably be either benzene, a monoalkylbenzene wherein the alkyl group has from 1 – 4 carbon atoms, a dialkylbenzene wherein the alkyl group has from 1 – 4 carbon atoms, a trialkylbenzene wherein the alkyl group has from 1 – 4 carbon atoms or mixtures thereof. In the preferred case, when the reaction product fed to the hydrogenation zone contains an aromatic hydrocarbon solvent used in recovering the aryl tertiary hydroperoxide from the oxidized product, the aromatic hydrocarbon extractant chosen will be the same as the aromatic hydrocarbon solvent present in the hydroperoxide cake fed to the rearranger thus eliminating a second separation step.

In the embodiment shown in the accompanying drawing, water is shown as being added to column 20 wherein the ketone is separated from the remainder of the product. If desired, the water can be added to the hydrogenated reaction product prior to its introduction into column 20, as for example into line 19. The amount of water added in distillation column 20 or prior thereto is sufficient to prevent precipitation of any of the hydroquinone in column 20 and will generally range from 4 – 10 times by weight the amount of hydroquinone in column 20.

To more fully illustrate the present invention, the following non-limiting example is presented. The system employed in the example was basically that shown in the accompanying drawing.

EXAMPLE

A reaction product stream produced by the acid catalyzed rearrangement of p-diisopropylbenzene dihydroperoxide and subsequent neutralization was hydrogenated at 180°F (Runs 1 - 6) and 170°F (Runs 7 and 8) using a catalyst consisting of 0.5% by weight palladium supported on one-eighth inch alumina pellets. The reaction product hydrogenated had the following composition:

| Component | % by weight |
|---|---|
| Acetone | ~ 62.0 |
| Benzene | ~ 30.0 |
| Hydroquinone (HQ) | 5.0 |
| Quinone | 0.01 |
| m-diisopropylbenzene | 0.03 |
| p-diisopropylbenzene | 0.32 |
| p-isopropenyl cumene (p-IPC) | 0.12 |
| p-isopropyl phenol | 1.23 |
| p-diisopropenyl benzene (p-DIENE) | 0.11 |
| p-isopropenyl phenol (p-IPEP) | 0.95 |
| p-acetyl cumene | 0.20 |
| p-isopropenylacetophenone | 0.16 |

In the table below is a list of the reaction conditions, the percent conversion of certain of the aryl tertiary alkenes to the corresponding alkane and the hydroperoxide numbers ($I_2$ number) of the unhydrogenated and hydrogenated material, the hydroperoxide number being a measure of the amount of hydroperoxide present.

| Run No. | Reaction Product Feed Rate (gal/min) | Hydrogen Feed Rate (cu ft/min) | LSHV (v/v/hr) | Pressure (psig) | p-IPC + p-DIENE Conversion (%) | p-IPEP Conversion (%) | HQ Recovery (%) | $I_2$ No. (Feed)[1] | $I_2$ No. (Product)[1] |
|---|---|---|---|---|---|---|---|---|---|
| 1 | 0.1 | 0.4 | 2.6 | 50 | 95 | 98 | 94 | 0.09 | Trace |
| 2 | 0.1 | 1.24 | 2.6 | 50 | 50 | 76 | 92 | 0.13 | 0.05 |
| 3 | 0.1 | 0.4 | 2.6 | 50 | 42 | 68 | 100 | 0.11 | 0.01 |
| 4 | 0.1 | 0.4 | 2.6 | 50 | 45 | 35 | 100 | — | — |
| 5 | 0.1 | 0.4 | 1.7 | 40 | 98 | 96 | — | — | — |
| 6 | 0.25 | 1.0 | 4.3 | 40 | 86 | 86 | — | — | — |
| 7 | 2.0 | 7.0 | 2.3 | 40 | 85 | 91 | 100 | 0.09 | 0.015 |
| 8 | 2.0 | 7.0 | 2.3 | 40 | 90 | 90 | 100 | 0.11 | 0.02 |

[1]Hydroperoxide content in wt. % calculated as p-α, α, α', α'-tetramethyl-xylylene dihydroperoxide It was found that hydroquinone recovered from unhydrogenated reaction product was, without carbon bed treatment, in general, a granular material which frequently failed water solubility tests. Moreover, polymer build up was noted in the benzene recovery column 25 when unhydrogenated reaction product was passed through the system.

Using hydrogenated reaction products and without the use of carbon bed treatment, the hydroquinone was recovered as a crystalline, granulated material which fully met water solubility tests even when the conversion of p-isopropenyl cumene and p-diisopropenylbenzene was only 35%. Moreover, polymeric build up in the benzene recovery column 25 was greatly reduced using hydrogenated reaction product. It was further noted that crystalline needles of hydroquinone with improved color properties could be recovered if the hydroquinone-water concentrate was passed through the carbon beds prior to crystallization. As noted, granulated, crystalline hydroquinone could be achieved even without the use of carbon bed treatment. A further advantage lies in the fact that if carbon bed treatment is employed, the bed life is extended as much as 3 to 4 times over the life obtained when unhydrogenated material is treated. Moreover, improved hydroquinone recovery has been observed as a result of removing the residual hydroperoxides which tend to catalyze hydroquinone decomposition.

We claim:

1. In a process for the recovery of hydroquinone from a reaction product comprising a ketone, said hydroquinone and minor amounts of hydroperoxides, aryl tertiary alkenes, and alkenyl phenols, said reaction product resulting from the acid catalyzed rearrangement of a paraditertiary alkyl benzene dihydroperoxide and subsequent neutralization, the improvement comprising subjecting said reaction product to selective hydrogenation to hydrogenate the olefinic unsaturation in said alkenes and alkenyl phenols and reduce said hydroperoxides and produce a hydrogenated reaction product, said hydrogenation being carried out in the presence of a hydrogenation catalyst and under conditions which effect selective hydrogenation of the olefinic unsaturates and reduction of the hydroperoxides without adversely affecting said ketone or said hydroquinone and at a temperature from about 100° to about 500°F. and a pressure of from about 10 to about 500 psig, adding water to said hydrogenated reaction product, separating said ketone from the mixture of said hydrogenated reaction product and water by distillation, extracting said mixture of said hydrogenated reaction product and water with an aromatic hydrocarbon extractant selected from the class consisting of benzene, a monoalkylbenzene wherein the alkyl group has from 1-4 carbon atoms, a dialkylbenzene wherein the alkyl group has from 1-4 carbon atoms, a trialkylbenzene wherein the alkyl group has from 1-4 carbon atoms and mixtures thereof and separating an aqueous phase containing said hydroquinone, removing at least a portion of the water from said aqueous phase to produce a water-hydroquinone concentrate, and crystallizing said hydroquinone from said concentrate.

2. The process of claim 1 wherein said hydrogenation is carried out by contacting said reaction product with hydrogen in the presence of a palladium hydrogenation catalyst at a temperature of from about 150° to about 250°F and at a pressure of from about 40 psig to about 100 psig.

3. The process of claim 1 including passing said water-hydroquinone concentrate through a carbon bed prior to crystallizing said hydroquinone.

4. The process of claim 1 wherein said aromatic hydrocarbon extractant is recovered and recycled to the extraction step.

5. The process of claim 1 wherein said reaction product contains in addition an aromatic hydrocarbon which is the same as said aromatic hydrocarbon extractant.

* * * * *